United States Patent [19]
Janos et al.

[11] Patent Number: 5,096,404
[45] Date of Patent: Mar. 17, 1992

[54] QUICK MOLD CHANGE ARRANGEMENT FOR INJECTION MOLDING MACHINES

[75] Inventors: Richard F. Janos, Keithville; Robert R. North; Gayson L. Terry, both of Shreveport, all of La.

[73] Assignee: AT&T Bell Laboratories, Murray Hill, N.J.

[21] Appl. No.: 606,650

[22] Filed: Oct. 31, 1990

[51] Int. Cl.$^5$ ............................................ B29C 45/66
[52] U.S. Cl. ................................. 425/190; 264/328.7; 425/451.9; 425/589; 425/595
[58] Field of Search ............... 425/185, 188, 190, 589, 425/595, 451.9; 264/328.7, 328.11

[56] References Cited

U.S. PATENT DOCUMENTS

| | | | |
|---|---|---|---|
| 4,500,274 | 2/1985 | Cyriax et al. | 425/190 |
| 4,810,181 | 3/1989 | Ozawa | 425/595 |
| 4,867,666 | 9/1989 | Brizio et al. | 425/595 |

*Primary Examiner*—Tim Heitbrink
*Attorney, Agent, or Firm*—Samuel R. Williamson

[57] ABSTRACT

A quick mold change arrangement positions and retains a mold tool in an operational mode in a mold press without the use of hydraulics. The tool is equipped with common quick change plates, and using an overhead crane is transported to the mold press and aligned in a vertical plane by rollers and guide rails. It is in its final alignment position when it rests on custom stop blocks and is retained by spring loaded clamp plates. The clamp plates are quickly seated by tightening screw-type fasteners with a tool such as an air impact wrench. The clamp plates prevent the mold tool from becoming mispositioned and damaged thereby or from creating a safety hazard. Horizontal tie bars in the mold press are also protected by the guide rails and rollers thereby preventing damage to these tie bars and resultant mold press down time. In addition, not only are mold tools quickly changeable but the mold press positioning and alignment details are also quickly changeable permitting non quick change tooling to be easily installed and removed from the mold press.

5 Claims, 7 Drawing Sheets

QUICK MOLD CHANGE ARRANGEMENT FOR INJECTION MOLDING MACHINES

BACKGROUND OF THE INVENTION

1. Technical Field

This invention relates to injection mold tooling and more specifically to efficient installation and removal of mold tools from mold presses.

2. Description of the Prior Art

In a typical molding shop there are several different sizes of mold presses and for each of these different press sizes, there are also many different mold tool sizes. Considerable time and effort is required to install and remove these variously sized mold tools as each generally requires a different method of installation, special alignment and a varying number of and arrangement of fasteners for securing such tool to mounting plates or pressure platens on a mold press.

In an effort to reduce this time consuming and inefficient process, standard quick change plates are now used for a particular family of press sizes. The various size mold tools are all mounted to quick change plates which are one standard size. A more efficient procedure is provided thereby since this essentially makes all tools for use with a particular family of press sizes to be the same from the standpoint of installation and removal of these tools from the mold press.

In a further effort to reduce the time required to remove a mold tool from a mold press and replace it with another, mold press arrangements employing common quick change plates also employ a hydraulic system to quickly secure the quick change plates after insertion of the tool. The hydraulic system also serves to retain the tool in the proper position during a molding operation. Securing of the mold tool is via retention tabs which are activated by the hydraulic system for seating and retaining the mold tool in the proper position.

A possible safety hazard may exist with this arrangement, however, if the retention tabs do not correctly seat the mold tool in place during installation. The mold tool consists of two parts which have complementary mating surfaces and are brought together between two platens with an extremely high contact pressure. Any misalignment of these two parts can result in damage occurring to the mold tool. Moreover, if the hydraulics fail during the normal molding operation, it is possible for the tool to be pulled out of position and fall from the mold press to the surface below. Each of these conditions could cause injury to an operator due to tool fragments being projected from the mold assembly or also molten plastic escaping from this assembly.

A disadvantage generally present in the design of mold press arrangements is that tie bars in the mold press are not adequately protected from damage during mold tool installation and removal. These tie bars provide the bearing surfaces for the moving platen and for alignment of the two platen surfaces. Another disadvantage of the described mold press arrangement is the relatively high cost of the hydraulic system used for securing the quick change plates.

SUMMARY OF THE INVENTION

In accordance with the invention, a quick mold change arrangement is provided for seating and retaining the mold tool in a proper position for operation in a mold press without the use of hydraulics. In preferred embodiments, the tool is equipped with common quick change plates and, using an overhead crane, is transported to the mold press and aligned in a vertical plane by custom designed rollers and guide rails. The mold tool is in its final aligned position when the quick change plates rests on custom stop blocks in the mold press. The quick change plates are retained in this position by spring loaded clamp plates which are quickly seated by driving screw-in type fasteners with a tool such as an air impact wrench. Any possiblity of the mold tool becoming mispositioned or creating a safety hazard is avoided by the strong clamping action provided by these spring loaded clamp plates.

In one aspect of the invention, a quick mold change arrangement for use in injection molding machines includes a pair of upstanding and spaced apart pressure platens and comprises vertical centering means affixed to each one of the pressure platens for maintaining in an aligned position a pair of quick change plates attached to a mold tool, the vertical centering means maintaining the quick change plates in the aligned position while the plates are being inserted into the arrangement. The arrangement further comprises a pair of stop blocks affixed to the lower portion of each pressure platen for respectively providing a vertical support surface for each of the quick change plates when the mold tool is in its final aligned position. The arrangement still further comprises means for retaining the mold tool in the aligned position, the retaining means including a pair of clamp plates for providing a horizontal support surface extending generally parallel to each upstanding pressure platen, each pair of the clamp plates being positioned in supportive engagement with one of the pair of quick change plates when the mold tool is in its final aligned position.

In another aspect of the invention, the guide rails and guide rollers are positioned in a manner in the quick mold change arrangement such that they provide protection for the tie bars thereby preventing damage to the mold press and resultant press down time. In addition, not only are mold tools quickly changeable with the quick mold change arrangement, but the mold press positioning and alignment details are also quickly changeable permitting non-quick change tooling to be easily installed and removed from a mold press.

BRIEF DESCRIPTION OF THE DRAWING

This invention and its mode of operation will be more clearly understood from the following detailed description when read with the appended drawing in which.

Throughout the drawings, the same element when shown in more than one FIG. is designated by the same reference numeral.

DETAILED DESCRIPTION

With reference to FIGS. 1 through 7 in combination, a quick mold change assembly 10 of an injection molding machine is illustrated. As shown in the perspective view of FIG. 1, the quick mold change assembly 10 includes an upstanding movable pressure platen 11 and an upstanding fixed pressure platen 12 mounted upon horizontally extending tie bars 13 through 16. Affixed to the fixed pressure platen 12 are guide rails 15 and 16 and to the movable pressure platen 11 are guide rails 17 and 18. These rails are illustratively represented by rail 15 which is easily seen in FIG. 3. At the upper portion of and affixed to each guide rail are lead-in guide rollers 21, 22, 35 and 36. These four rollers are illustratively represented by rollers 21 and 22 and are also more easily seen in FIG. 3. Also respectively affixed to the lower portion of upstanding fixed pressure platen 12 and upstanding movable pressure platen 11 are stop blocks 19 and 20 which are easily seen in FIG. 2. Also in FIG. 2, many of the details of the quick change hardware, comprising the guide rails 15 through 18, the stop blocks 19 and 20 and the clamping plates 26 through 30 are provided. This quick change hardware is shown in this figure in the "ready to load" position for receiving a mold tool mounted on a pair of quick change plates. Each clamping plate is respectively connected to one of the guide rails by screw-in type fasteners comprising, for example, lock-down bolts 32 and safety bolts 33 illustratively shown in FIG. 3.

Multiple coil springs 34 are also employed between each guide rail and clamp plate to maintain the clamp plate in a position deflected away from the guide rail when a mold tool is being loaded. The details of the securing of the guide rails to the upstanding pressure platens and the clamp plates to the guide rails are best seen with reference to FIGS. 3 and 4. These details are to be considered only in the context of illustrating one possible fastening arrangement. The number of fasteners and their placement will vary with factors such as the size of the mold press and the weight of the mold tool. Thus for illustration purposes, there are shown multiple fasteners comprising guide rail clamp bolts 31 and also multiple lock-down bolts 32. A safety bolt 33 is centrally disposed inside each coil spring 34 which deflects the clamp plate 27 away from the guide rail 16 when loading a quick change plate such as plate 24. In this deflected position, however, the clamp plate 27 is still able to provide security for the mold tool while it is being loaded in that the safety bolts 33 restrain the quick change plate 24 from being deflected too far away from the guide rail 16 and thus its corresponding upstanding pressure platen 12.

Figure 1:
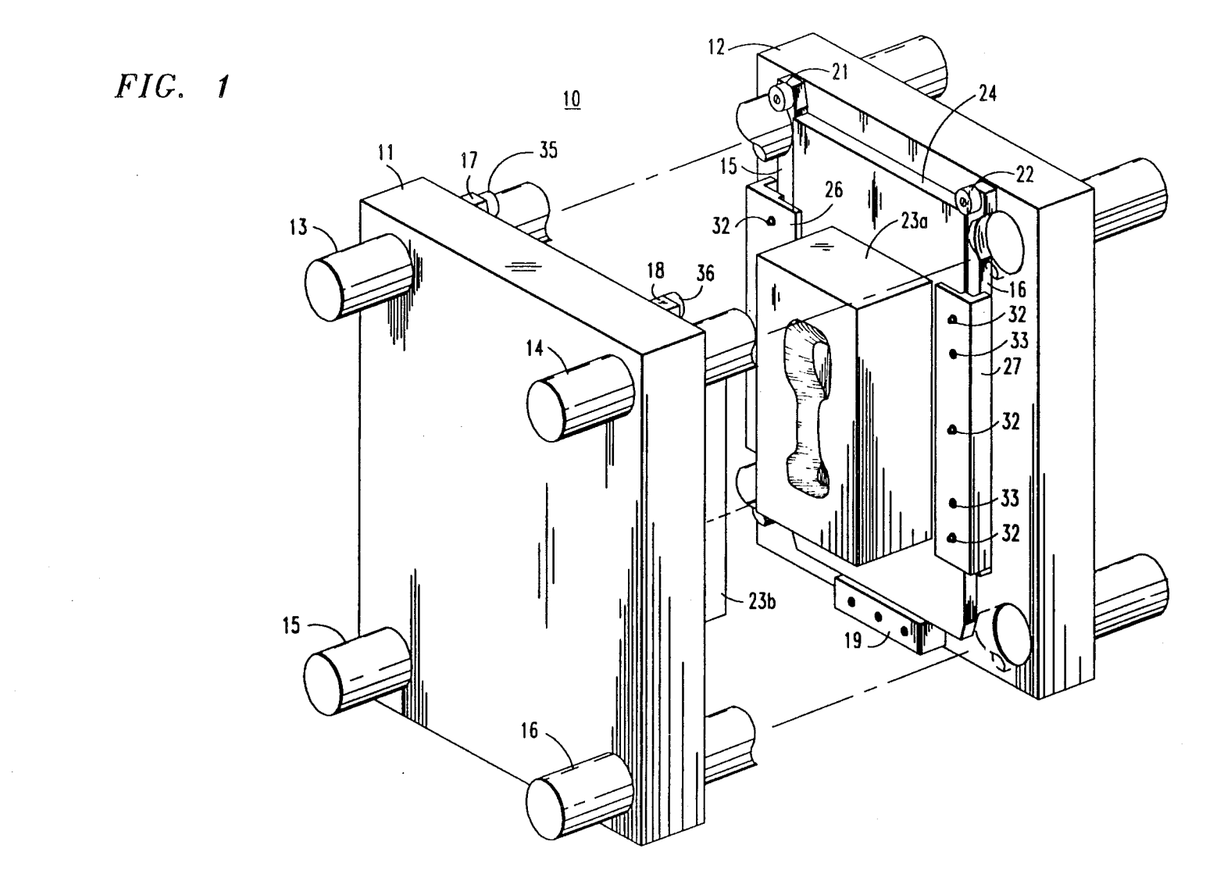
FIG. 1 is a prospective view of a mold press, partially in section, showing two sections of a mold tool spaced apart and respectively attached to quick change plates which are secured to upstanding platens by quick change hardware in accordance with the invention.
Figure 2:
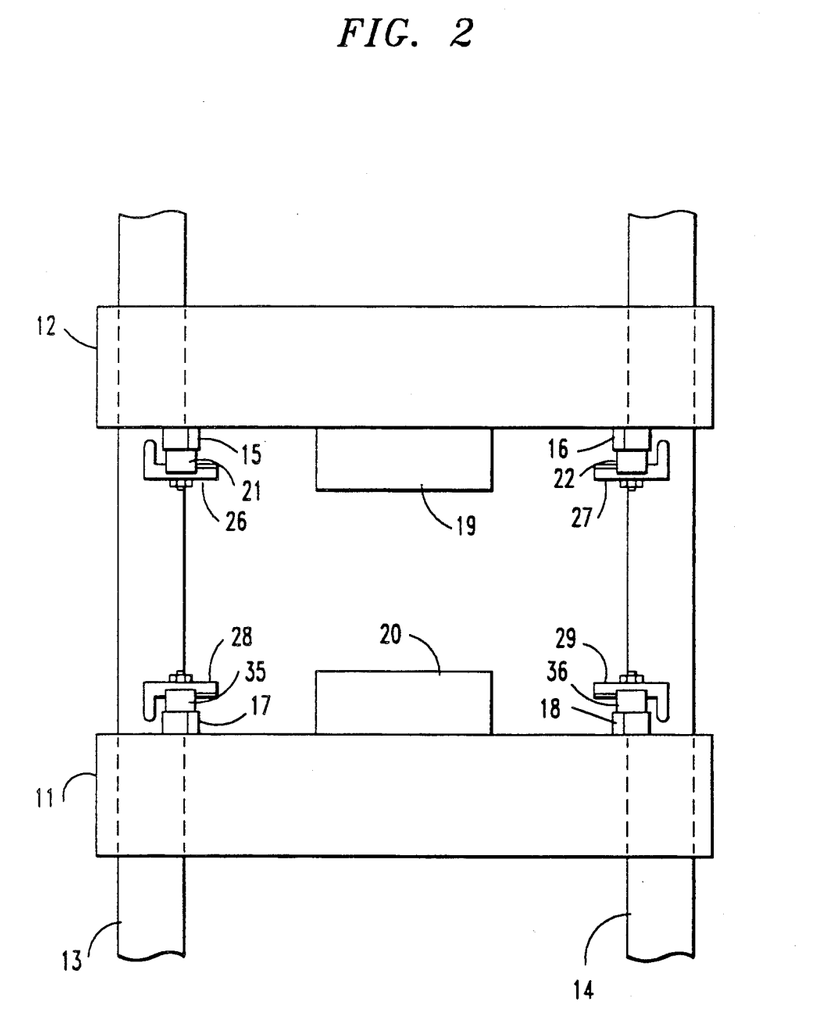
FIG. 2 is a top plan view of the mold press including the upstanding platens, tie bars and quick change hardware in the "ready to load" position.

Also shown in FIG. 1, and in greater detail in FIGS. 3, 5, 6 and 7, is the mold tool 23 connected to standard quick change plates 24 and 25. This mold tool 23 comprises two interlocking sections 23a and 23b. One of these sections has one or more surface cavities and the other has one or more surface projections which align with the surface cavities in a complementary manner to form a narrow chamber for receiving plastic or other material during the molding process. The molting plastic or other material is injected into the chamber formed by these two interlocking sections to mold a portion of an enclosure for, by way of example, a telephone handset.

Figure 3:
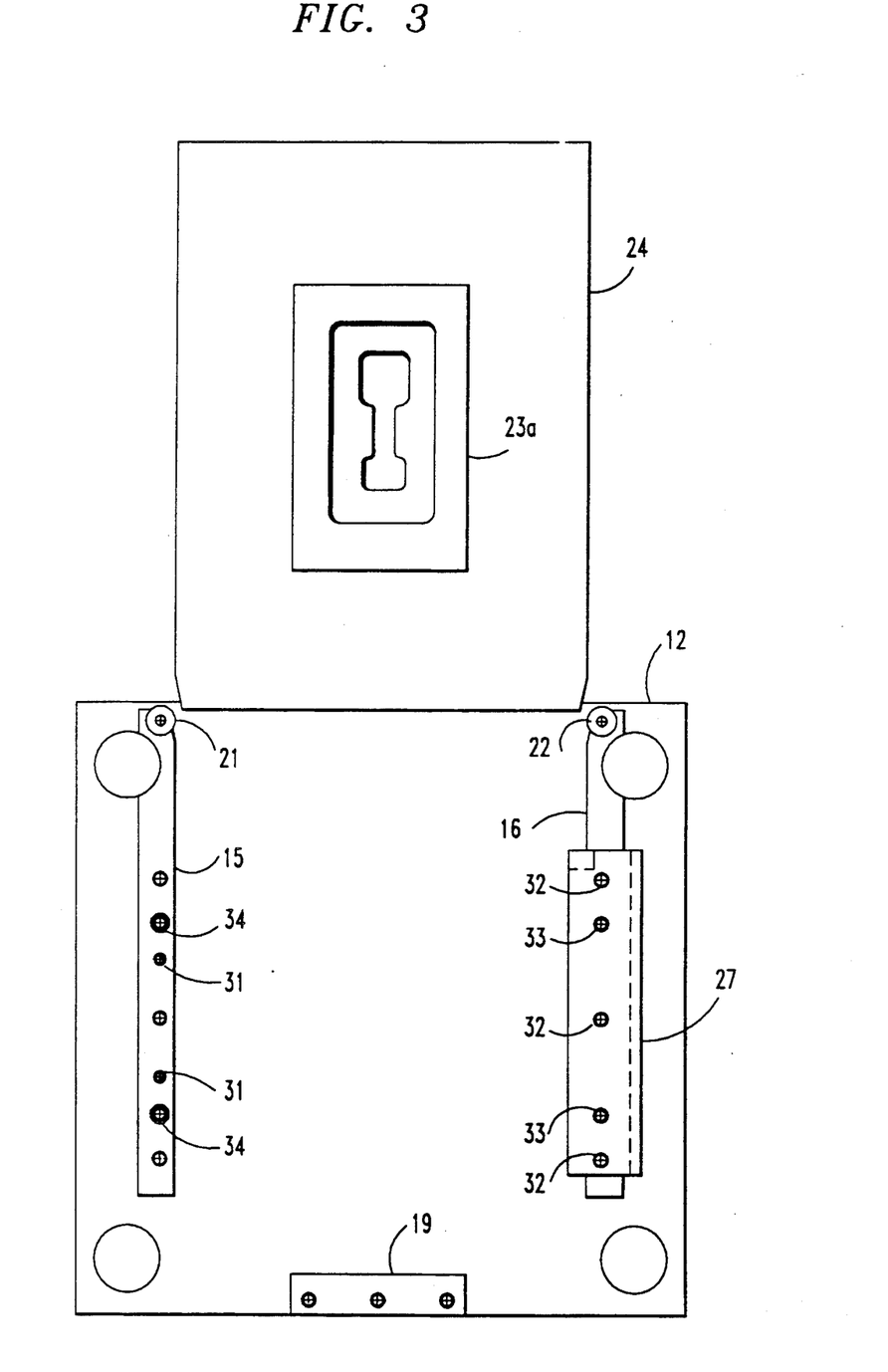
FIG. 3 is a front elevation view of the mold press illustrating one section of the mold tool attached to a quick change plate which is positioned at its entry point to the mold press, and in particular, illustrates the quick change hardware, partially in section, this hardware including a pair of guide rollers, guide rails and a stop block secured to the upstanding platen and a pair of clamp plates—only one is shown—overlapping and affixed to an associated one of the guide rails.
Figure 4:
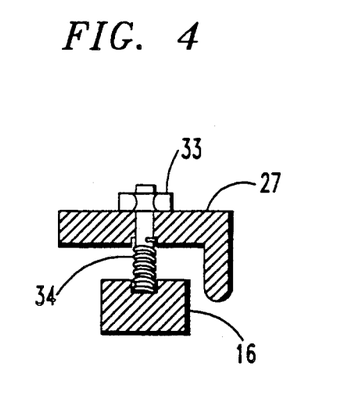
FIG. 4 is a cross section view of a safety bolt and coil spring for attaching the overlapping clamp plates to the guide rails of the mold press.

In the loading operation of the mold tool 23, the quick change plates 24 and 25, with the mold tool juxtaposed therebetween, are hoisted by an overhead crane and then lowered between the pressure platens 11 and 12. For ease of understanding this operation, FIG. 3 shows only section 23a of the mold assembly and only the upstanding pressure platen 12 with its quick change hardware. The quick change plate 24 is lowered and first encounters the lead-in guide rollers 21 and 22 which centers this plate. As the quick change plate 24 is lowered further, it contacts the guide rails 15 and 16 which further restrict its lateral movement and keep it centered until the bottom surface of the quick change plate 24 comes to rest on the top surface of the stop block 19, as seen more clearly in FIG. 7. The two clamp plates 26 and 27, used for restraining the quick change plate 24, are illustratively represented by clamp plate 27. The lock-down bolts 32 for both clamp plates 26 and 27 are then tightened so that quick change plate 24 is secured against the fixed pressure platen 12.

Figure 5:
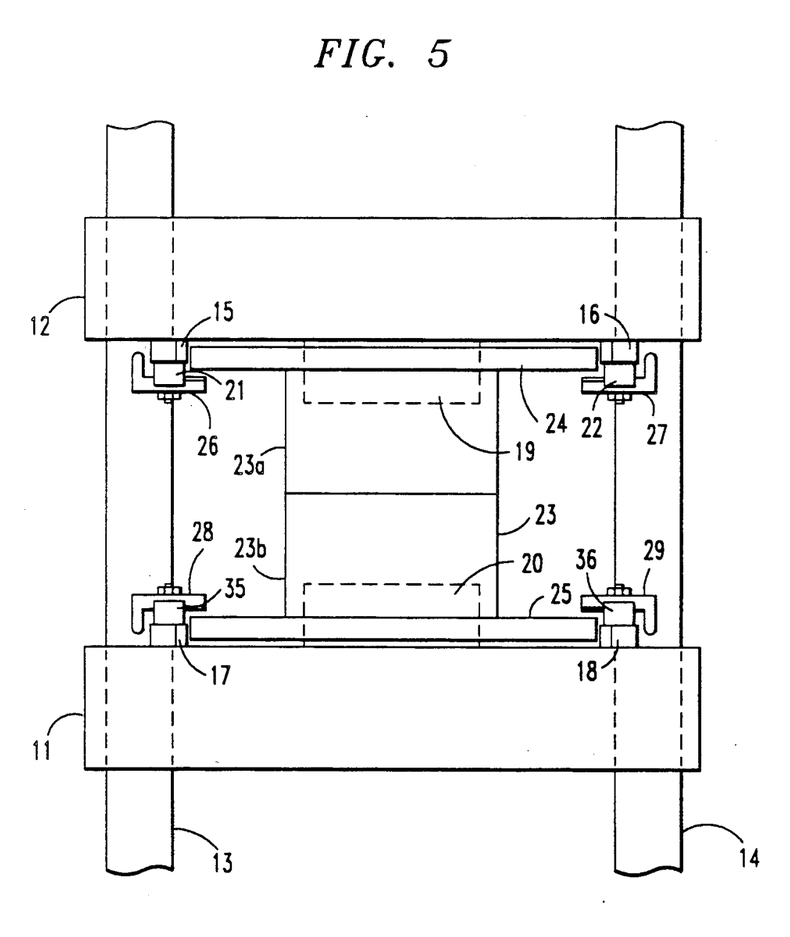
FIG. 5 is a top plan view of a mold press including the mold tool and the quick change plates in a "loaded but unclamped" position in the quick change hardware.

With reference to FIG. 5, there is shown the quick change plates 24 and 25 with the mold tool 23 affixed thereto and these plates fully seated respectively on stop blocks 19 and 20. Clamp plates 26 through 29 are shown in their unclampled position. When these clamp plates are in this position, the mold tool 23 and quick change plates 24 and 25 are in a "loaded but unclamped" position in the quick change hardware. As previously indicated, these clamp plates 26 through 29 are deflected away from the pressure platen by multiple coil springs 34, the clamp plates also being retained in position by multiple safety bolts 33 dispersed along the length of each clamp plate.

Figure 6:
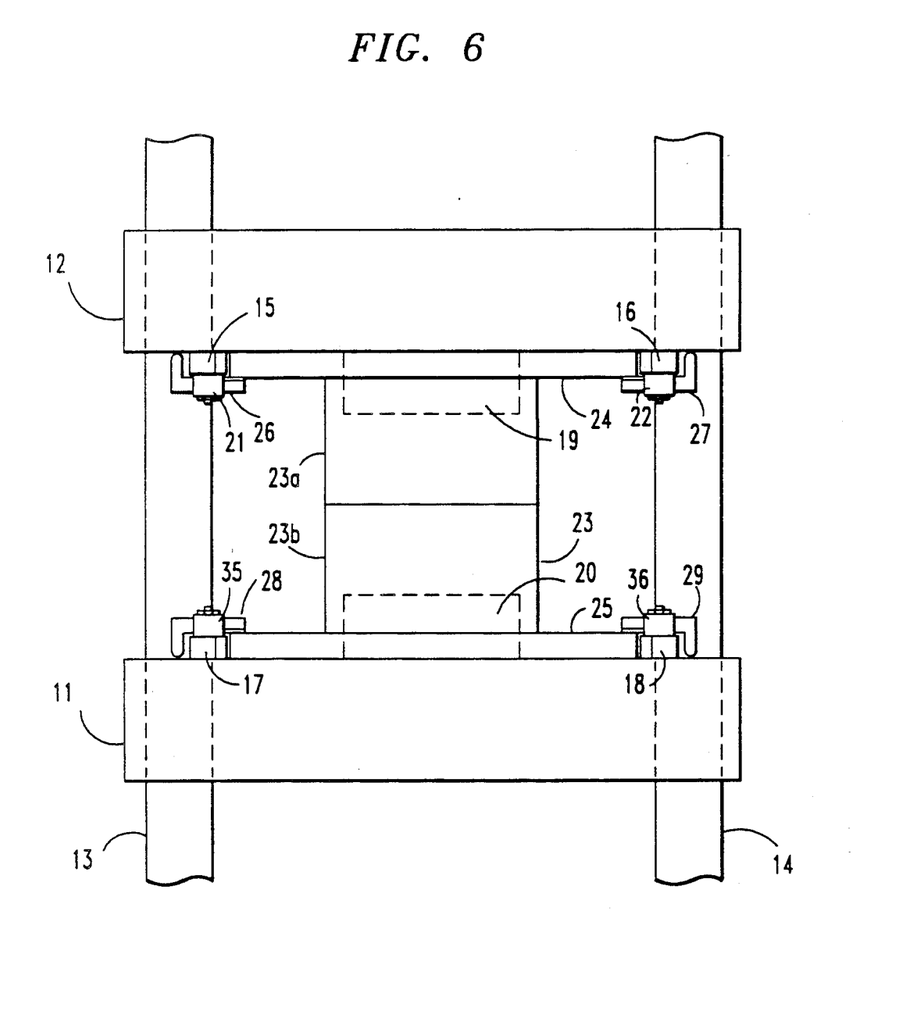
FIG. 6 is a top plan view of the mold press shown in FIG. 5 including the mold tool and the quick change plates in a "loaded and clamped" position in the quick change hardware.
Figure 7:
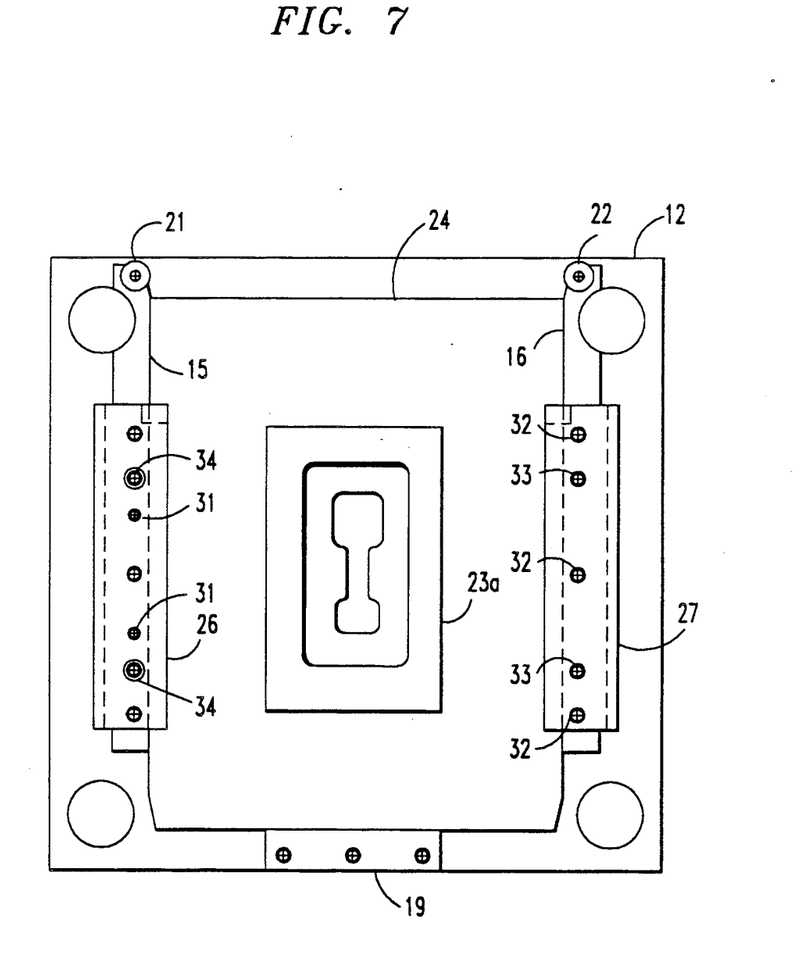
FIG. 7 is a front elevation view of the mold press, partially in section, including the mold tool and the quick change plates in the "loaded and clamped" position in the quick change hardware.

In FIGS. 6 and 7, the clamp plates 26 through 29 are moved into supportive engagement with the quick change plates 24 and 25 thereby securing these plates to their associated pressure platens. In this position, the mold tool 23 and the quick change plates 24 and 25 are in the "loaded and clamped" position in the quick change hardware. The clamp plates 26 through 29 are quickly and easily clamped by driving the screw-in type lock-down bolt fasteners 32 with a tool such as an air impact wrench. The interaction between each stop block and its related clamp plates provides the sole means of seating and restraining movement of the mold tool. Each stop block restrains movement of the mold tool in a direction generally parallel to the height of the mold tool and the clamp plates restrain movement of the tool in a direction generally orthogonal to the height of the mold tool.

Figure 8:
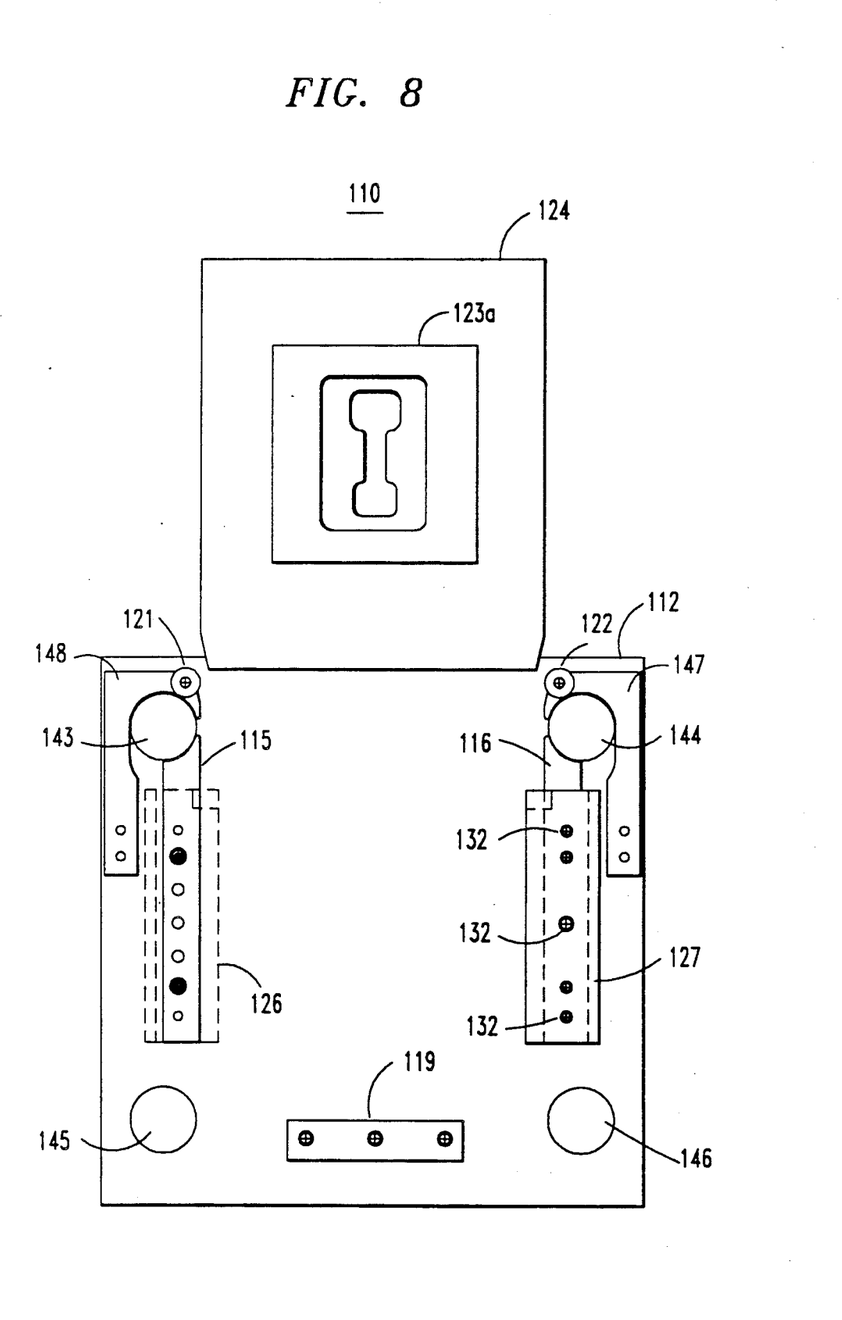
FIG. 8 is a front elevation view of a non-standard size mold press modified in accordance with the invention to accept a standard size quick change plate employed in standard size mold presses, and illustrates one section of a mold tool attached to the standard size quick change plate positioned at the entry point to the mold press, and in particular, illustrates the quick change hardware, partially in section, this hardware including guide rollers, guide rails and a stop block secured to the upstanding platen and also clamp plates overlapping and mounted to the guide rails.

Referring next to FIG. 8, there is shown a front elevation view of a non-standard size mold press 110 modified in accordance with the invention to accept a standard size quick change plate employed in other standard mold presses. One section of a mold tool 123a is attached to the standard size quick change plate 124 which is positioned at its entry point to the mold press 110. The quick change hardware, shown partially in section, includes guide rails 115 and 116 and a stop block 119 secured to an upstanding pressure platen 112. Overlapping clamp plates 126 and 127 are respectively affixed to the guide rails 115 and 116 through the use of screw-in type lock-down bolt fasteners 132.

The mold press shown in FIG. 8 is considered non-standard in that it does not easily accept a standard size quick change plate because of the reduced horizontal center to center spacing of an upper pair of tie bars (not shown) which pass through openings 143 and 144 and a lower pair of tie bars (also not shown) which pass through openings 145 and 146. Because of this reduced spacing, guide rails 115 and 116 can not be extended upward beyond the openings 143 and 145 provided for the tie bars. And yet, in accordance with the invention, lead-in guide rollers 121 and 122 are desirable to protect the tie bars during the insertion of the quick change plate 124 into the mold press 110.

To compensate for the reduced horizontal center to center spacing of the tie bars in this non-standard size mold press, lead-in guide rollers 121 and 122 are connected to guide roller clamps 147 and 148. These clamps provide the rigid support required for connecting the guide rollers 121 and 122 to the upstanding pressure platen and, at the same time, also provide the desired protection for the tie bars from possible damage that might otherwise be caused by the common quick change plate 124 striking these tie bars as it is inserted into the remainder of the quick change hardware.

Since both upstanding pressure platens in the quick mold change arrangements herein described are unencumbered by hydraulic lines for actuating retention tabs and the like, they may be easily reconfigured for permitting non-quick change tooling to be installed and removed from a mold press. In achieving this reconfiguration, the quick release type screw-in fasteners holding the guide rollers, guide rails and clamp plates are all removed from the surface of the pressure platens and mounting holes on the platens which accommodate the non-quick change tooling are located and used for mounting this non-quick change tooling. Also, if the non-quick change tooling is small and will fit within the area on the pressure platen normally occupied by a quick change plate, then this non-quick change tooling may be mounted directly to the surface of the pressure platens and inside of the area occupied by the quick change hardware without removal or disturbance of this hardware.

Obviously, many modifications and variations of the present invention are possible in light of the above teachings. It is therefore to be understood that within the scope of the appended claims the invention may be practiced otherwise than as specifically described.

We claim:

1. A quick mold change arrangement for use in injection molding machines, the arrangement including a pair of upstanding and spaced apart pressure platens, the arrangement comprising:

vertical centering means affixed to each one of the pressure platens for maintaining in an aligned position a pair of quick change plates attached to a mold tool, the vertical centering means including a pair of spaced apart and parallel extending guide rails affixed to each upstanding pressure platen, and a pair of guide rollers affixed to the uppermost portion of each upstanding pressure platen, the guide rollers being disposed so as to preclude contact between the quick change plates and an upper pair of horizontally extending tie bars while the quick change plates are being inserted into the arrangement, and the guide rails maintaining the quick change plates in the aligned position while the plates are being inserted into the arrangement;

a pair of stop blocks affixed to the lower portion of each pressure platen for respectively providing a horizontal support surface for each of the quick change plates when the mold tool is in its final aligned position; and means for retaining the mold tool in the aligned position, the retaining means including a pair of clamp plates for providing a vertical support surface extending generally parallel to each upstanding pressure platen, each pair of the clamp plates being affixed to one of the pair of pressure platens by spring loaded bolts, the clamp plates being deflected away from the pressure platen by springs of the spring loaded bolts for ease of mounting the mold tool, and each pair of the clamp plates being positioned in supportive engagement with one of the pair of quick change plates by tightening the spring loaded bolts when the mold tool is in its final aligned position.

2. The quick mold change arrangement as in claim 1 wherein interaction between the horizontal support surface provided by the stop blocks and the vertical support surface provided by the clamp plates provides a sole means for restraining movement of the mold tool, the stop blocks restraining movement of the tool in a direction generally parallel to the height of the mold tool and the clamp plates restraining movement of the tool in a direction generally orthogonal to the height of the mold tool.

3. The quick mold change arrangement as in claim 2 wherein at least one of the platens is slidably mounted on the upper and a lower pair of horizontally extending tie bars.

4. A quick mold change arrangement for use in injection molding machines, the arrangement including a pair of upstanding pressure platens with at least one of the platens being slidably mounted on an upper and a lower pair of horizontally extending tie bars, the arrangement comprising:

a pair of quick change plates for mounting a mold tool, the plates extending in generally parallel planes and disposed on opposite sides of the mold tool:

vertical centering means affixed to each one of the pressure platens for maintaining in an aligned position the pair of quick change plates, the vertical centering means including a pair of spaced apart and parallel extending guide rails affixed to each upstanding pressure platen, and a pair of guide rollers affixed to the uppermost portion of each upstanding pressure platen, the guide rollers being disposed so as to preclude contact between the quick change plates and the upper pair of horizontally extending tie bars while the quick change plates are being inserted into the arrangement, and the guide rails maintaining the quick change plates in an aligned position while the plates are being inserted into the arrangement;

a pair of stop blocks affixed to the lower portion of each pressure platen for respectively providing a horizontal support surface for each of the quick change plates when the mold tool is in its final aligned position; and means for retaining the mold tool in the aligned position, the retaining means including a pair of clamp plates affixed to each pressure platen and providing a vertical support surface extending generally parallel to each upstanding pressure platen, each pair of the clamp plates being affixed to one of the pair of pressure platens by spring loaded bolts, the clamp plates being deflected away from the pressure platen by springs of the spring loaded bolts for ease of mounting the mold tool, and each pair of the clamp plates being positioned in supportive engagement with one of the pair of quick change plates by tightening the spring loaded bolts when the mold tool is in its final aligned position.

5. The quick mold change arrangement as in claim 4 wherein the stop blocks and the clamp plates provide a complete means for restraining movement of the mold tool, the stop blocks restraining movement of the tool in a direction generally parallel to the height of the mold tool and the clamp plates restraining movement of the tool in a direction generally orthogonal to the height of the mold tool.

* * * * *